United States Patent
Kharisov et al.

(10) Patent No.: US 9,911,442 B1
(45) Date of Patent: Mar. 6, 2018

(54) FEEDFORWARD COMPENSATION FOR MULTI-ACTUATOR HARD DRIVES

(71) Applicant: Seagate Technology LLC, Cupertino, CA (US)

(72) Inventors: Evgeny Kharisov, Chaska, MN (US); Josiah Natan Wernow, St. Paul, MN (US); Kenneth A. Haapala, Plymouth, MN (US); John C. Morris, Eden Prairie, MN (US); Raye A. Sosseh, Minneapolis, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/360,540

(22) Filed: Nov. 23, 2016

(51) Int. Cl.
 *G11B 5/55* (2006.01)

(52) U.S. Cl.
 CPC .......... *G11B 5/5578* (2013.01); *G11B 5/5547* (2013.01); *G11B 5/5552* (2013.01); *G11B 5/5565* (2013.01); *G11B 5/5582* (2013.01)

(58) Field of Classification Search
 CPC ............. G11B 5/5547–5/5582; G11B 5/59694
 USPC ........ 360/55, 75, 77.04, 78.05, 78.09, 78.12
 See application file for complete search history.

(56) References Cited

U.S. PATENT DOCUMENTS

| | | | |
|---|---|---|---|
| 4,270,154 A | 5/1981 | Crawford | |
| 4,423,448 A | 12/1983 | Frandsen | |
| 4,544,972 A | 10/1985 | Kogure et al. | |
| 4,937,693 A | 6/1990 | Connolly et al. | |
| 5,223,993 A | 6/1993 | Squires et al. | |
| 5,261,058 A | 11/1993 | Squires et al. | |
| 5,274,773 A | 12/1993 | Squires et al. | |
| 5,293,282 A | 3/1994 | Squires et al. | |
| 5,341,351 A | 8/1994 | Ng | |
| 5,343,345 A | 8/1994 | Gilovich | |
| 5,343,347 A | 8/1994 | Gilovich | |
| 5,355,486 A | 10/1994 | Cornaby | |
| 5,412,666 A | 5/1995 | Squires et al. | |
| 5,477,401 A | 12/1995 | Squires et al. | |
| 5,523,901 A | 6/1996 | Anderson et al. | |
| 5,610,808 A | 3/1997 | Squires et al. | |
| 5,761,007 A | 6/1998 | Price et al. | |
| 5,805,386 A | 9/1998 | Faris | |
| 5,983,485 A | 11/1999 | Misso | |
| 6,005,743 A | 12/1999 | Price et al. | |

(Continued)

OTHER PUBLICATIONS

Zheng et al. "Feedforward Decoupling Control Design for Dual-Actuator System in Hard Disk Drives". IEEE Transactions on Magnetics. pp. 2080-2082. vol. 40, No. 4. Jul. 2004.

(Continued)

*Primary Examiner* — Wayne Young
*Assistant Examiner* — James L Habermehl
(74) *Attorney, Agent, or Firm* — Faegre Baker Daniels LLP (57) ABSTRACT

An apparatus includes a first controller, a second controller, and a coupling compensator. The first controller is configured to generate a first voice coil motor (VCM) control signal in response to a first position error signal. The second controller is configured to generate a second VCM control signal in response to a second position error signal. The coupling compensator is configured to generate a first feedforward correction signal in response to the first VCM control signal. The first feedforward correction signal modifies the second VCM control signal to generate a modified second VCM control signal.

20 Claims, 7 Drawing Sheets

(56) References Cited

U.S. PATENT DOCUMENTS

| | | |
|---|---|---|
| 6,005,747 A | 12/1999 | Gilovich |
| 6,057,990 A | 5/2000 | Gilovich |
| 6,121,742 A | 9/2000 | Misso |
| 6,344,938 B1 | 2/2002 | Smith |
| 6,384,998 B1 | 5/2002 | Price et al. |
| 6,449,130 B1 | 9/2002 | Koyama |
| 6,490,138 B1 | 12/2002 | Prater |
| 6,493,172 B1 | 12/2002 | Morris et al. |
| 6,519,109 B1 | 2/2003 | Price et al. |
| 6,560,075 B2 | 5/2003 | Price et al. |
| 6,563,657 B1 | 5/2003 | Serrano et al. |
| 6,603,640 B1 | 8/2003 | Prater et al. |
| 6,678,120 B2 | 1/2004 | Money |
| 6,687,092 B2 | 2/2004 | Kan et al. |
| 6,690,549 B1 | 2/2004 | Aikawa et al. |
| 6,731,454 B2 * | 5/2004 | Sri-Jayantha ............ G11B 5/55 360/78.12 |
| 6,735,032 B2 | 5/2004 | Dunn et al. |
| 6,819,513 B2 | 11/2004 | Chainer et al. |
| 6,847,504 B1 | 1/2005 | Bennett et al. |
| 6,958,882 B2 * | 10/2005 | Kisaka ................. G11B 5/5582 360/78.04 |
| 7,031,115 B1 | 4/2006 | Gilovich |
| 7,102,842 B1 | 9/2006 | Howard |
| 7,146,623 B2 | 12/2006 | Kuwajima et al. |
| 7,199,981 B2 | 4/2007 | Zabtcioglu |
| 7,315,429 B2 | 1/2008 | Van Zyl |
| 7,385,781 B1 | 6/2008 | Craig et al. |
| 7,430,091 B2 | 9/2008 | Manasse |
| 7,469,463 B2 | 12/2008 | Prater et al. |
| 7,492,542 B2 | 2/2009 | Van Zyl |
| 7,710,683 B2 | 5/2010 | Craig et al. |
| 7,760,463 B2 | 7/2010 | Ward et al. |
| 8,028,311 B2 | 9/2011 | Gilovich |
| 9,053,724 B1 * | 6/2015 | Chahwan ............. G11B 5/5582 |
| 9,460,744 B1 * | 10/2016 | Gaub ................. G11B 5/59694 |
| 9,536,553 B1 * | 1/2017 | Seo ........................ G11B 5/556 |
| 9,542,966 B1 * | 1/2017 | Zheng ................... G11B 5/556 |
| 9,601,143 B1 * | 3/2017 | Seo ................... G11B 5/59694 |
| 2002/0039259 A1 | 4/2002 | Koyama et al. |
| 2002/0060885 A1 | 5/2002 | Money |
| 2003/0090838 A1 | 5/2003 | Pottebaum et al. |
| 2007/0297083 A1 | 12/2007 | Van Zyl |
| 2012/0250177 A1 | 10/2012 | Somanache et al. |
| 2014/0063651 A1 | 3/2014 | Wernow et al. |

OTHER PUBLICATIONS

Zheng et al. "Identification and Decentralized Control of a Dual-Actuator Hard Disk Drive System". IEEE Transactions on Magnetics. pp. 2515-2521. vol. 41, No. 9. Sep. 2005.

* cited by examiner

FEEDFORWARD COMPENSATION FOR MULTI-ACTUATOR HARD DRIVES

SUMMARY

In certain embodiments, an apparatus includes a first controller, a second controller, and a coupling compensator. The first controller is configured to generate a first voice coil motor (VCM) control signal in response to a first position error signal. The second controller is configured to generate a second VCM control signal in response to a second position error signal. The coupling compensator is configured to generate a first feedforward correction signal in response to the first VCM control signal. The first feedforward correction signal modifies the second VCM control signal to generate a modified second VCM control signal.

In certain embodiments, an apparatus includes a first controller, a second controller, a feedforward seek controller, and a notch filter. The first controller is configured to generate a first voice coil motor (VCM) control signal in response to a first position error signal. The second controller is configured to generate a second VCM control signal in response to a second position error signal. The feedforward seek controller is configured to generate a feedforward seek signal. The notch filter is configured to suppress targeted frequencies of the feedforward seek signal to generate a filtered feedforward seek signal. The filtered feedforward seek signal modifies the first VCM control signal to generate a modified first VCM control signal.

In certain embodiments, an integrated circuit includes means for generating a first voice coil motor (VCM) control signal, means for generating a second VCM control signal, and means for generating a feedforward correction signal in response to the first VCM control signal and for outputting the feedforward correction signal to the second VCM control signal.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope the appended claims.

DETAILED DESCRIPTION

Certain embodiments of the present disclosure are directed to servo control systems for hard drives with multiple actuators, which are able to process more data faster than single-actuator hard drives. More particularly, certain embodiments of the present disclosure are directed to disturbance compensation approaches for use in multi-actuator hard drives.

Figure 1:
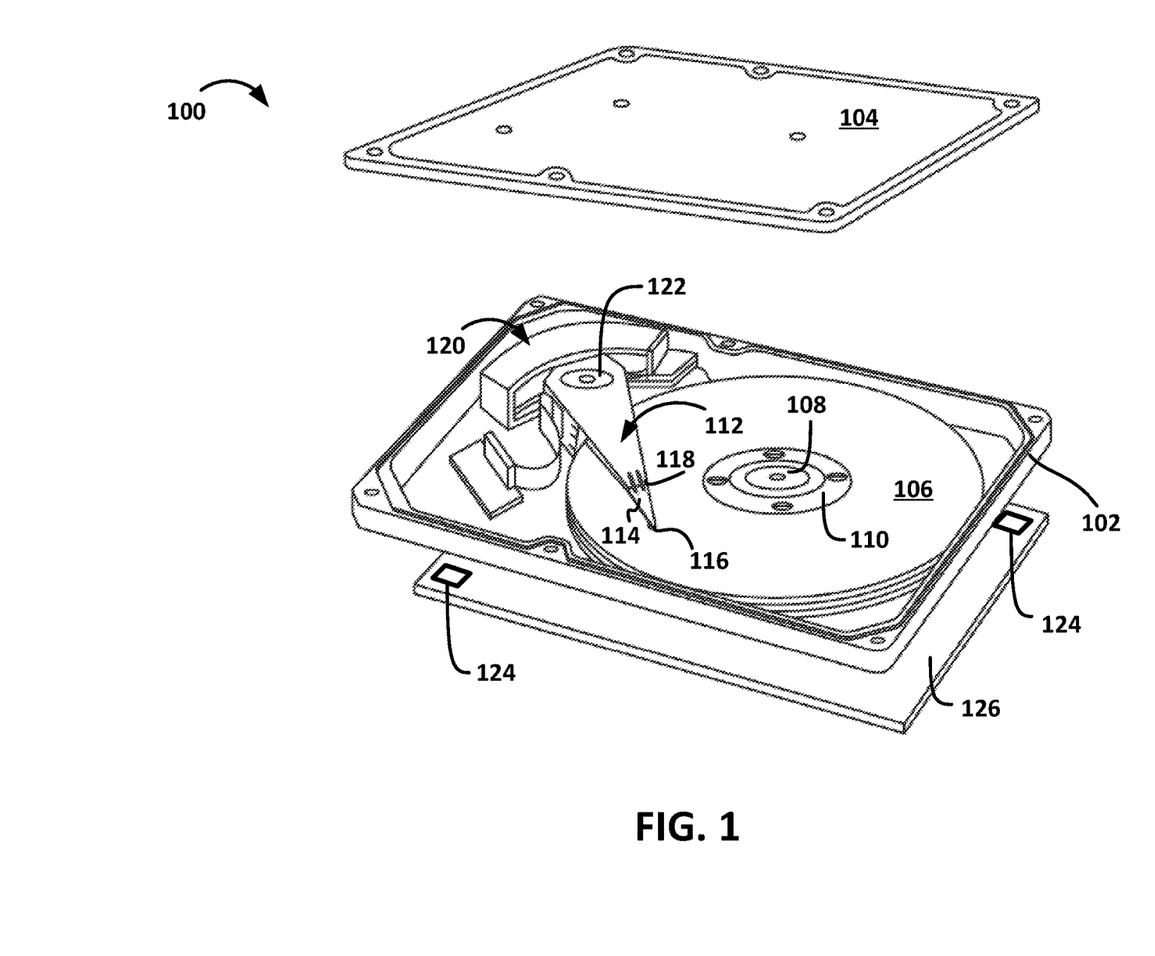
FIG. 1 shows an exploded, perspective view of a single-actuator hard drive.

FIG. 1 shows an exploded, perspective view of a single-actuator hard drive 100 having a base deck 102 and top cover 104. The hard drive 100 includes magnetic recording disks 106 coupled to a spindle motor 108 by a disk clamp 110. The hard drive 100 also includes an actuator assembly 112 coupled to a suspension 114 that positions read/write heads 116 over data tracks on the magnetic records disks 106. Each read/write head 116 can be coupled to a microactuator 118, which assists with positioning the read/write head 116 over a desired track on the magnetic recording disks 106. Each microactuator 118 can be positioned at least partially on or between the suspension 114 and one of the read/write heads 116. As appreciated by one skilled in the art, the read/write heads 116 may be coupled to the suspension 114 by a head-gimbal assembly (not shown). During operation, the spindle motor 108 rotates the magnetic recording discs 106 while the actuator assembly 112 is driven by a voice coil motor assembly 120 to pivot around a pivot bearing 122. The hard drive 100 further includes a servo control system that controls rotation of the actuator assembly 112 via the voice coil motor (VCM) assembly 120 and controls actuation of the microactuator 118 to position the read/write heads 116 over a desired track on the magnetic recording disks 106 for reading and writing operations. The actuator assembly 112 may be coupled to the pivot bearing 122 by an adhesive or a tolerance ring (not shown).

The voice coil motor assembly 120 (including a voice coil) and microactuator 118 are arranged to carry out various positioning operations (e.g., track seeking, track settling, track following) that position the read/write heads 116 over a desired track of the magnetic recording disks 106 to read data from or write data to a desired track. For example, in response to a command to read data from or write data to a track different from where a read/write head 116 is currently positioned (i.e., a track-seeking operation), a current may be applied to the voice coil of the voice coil motor assembly 120 to rotate the actuator assembly 112 (and therefore the read/write head 116) towards the desired track. As the read/write head 116 nears the desired track, the microactuator 118 may be activated to assist the voice coil motor assembly 120 with settling over the desired track (i.e., a track-settling operation). For example, the microactuator 118 can include elements formed of lead-zirconate-titanate (PZT) and, as such, may extend (e.g., lengthen) in response to a positive applied voltage or contract (e.g., shorten) in response to a negative applied voltage. In certain configurations, when one of the PZT elements extends and the other PZT element shortens or maintains its length, the read/write head 116 will pivot. Once the read/write head 116 is positioned over the desired track, the microactuator 118 may be used to compensate for small positioning errors (i.e., a track-follow operation). It is appreciated that the microactuator 118 may be positioned anywhere on actuator assembly 112. For example, the microactuator 118 may be positioned between the suspension 114 and the read/write head 116. In certain embodiments, the suspension 114 is separated into multiple sections and the microactuator 118 may be positioned between the multiple sections. Moreover, the actuator assembly 112 may include multiple sets of microactuators. For example, the hard drive 100 may utilize a dual- or triple-stage actuation system, which may refer to a number of actuation systems (e.g., voice coil motor assembly, microactuators) used by the hard drive 100 to position the read/write heads 116.

During operation, hard drives may experience internal disturbances and/or be subject to external disturbances that affect hard drive performance and can cause data reading and writing errors. External disturbances can include, for example, vibration in a computer chassis caused by acoustic signals generated by speakers coupled to the computer chassis. Internal disturbances primarily arise from the three different sources: head/suspension interaction with disturbed airflow, self-induced seeking vibration, and spindle motor vibrations.

These disturbances may cause the actuator assembly 112 to vibrate to such an extent that the actuator assembly 112 is unable to accurately maintain a desired position over the magnetic recording disks 106. The disturbances may cause the actuator assembly 112 and the read/write heads 116 to move off the desired track (i.e., off-track). This results in reduced performance and/or writing or reading errors because the read/write heads 116 are knocked off-track—making it difficult for a positioning system (e.g., servo control system) to correct the position of the actuator assembly 112 before the read or write operation is completed. An off-track writing error may result in a hard error where the read/write heads 116 write data to an unknown track, which may overwrite already-written data. An off-track reading error may result in an operation called a read retry where the hard drive 100 attempts to re-read the desired data, which can affect performance of a computer using the hard drive 100. In some embodiments, the hard drive 100 includes one or more vibration sensors 124 positioned on a printed circuit board assembly 126. The one or more vibration sensors 124 are configured to detect vibration of the hard drive 100.

Figure 2A:
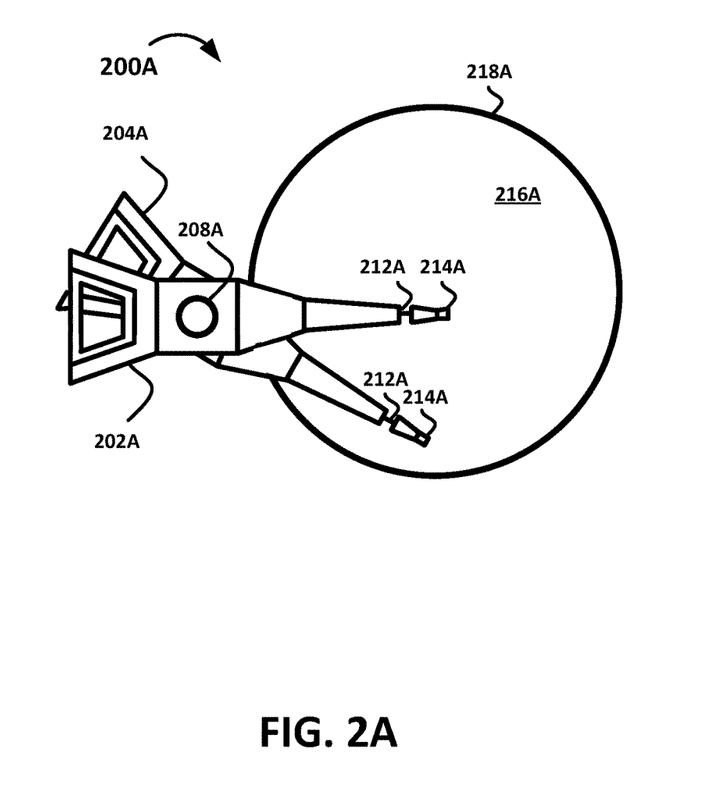
FIGS. 2A and 2B show top-view schematics of multi-actuator configurations, in accordance with certain embodiments of the present disclosure.
Figure 2B:
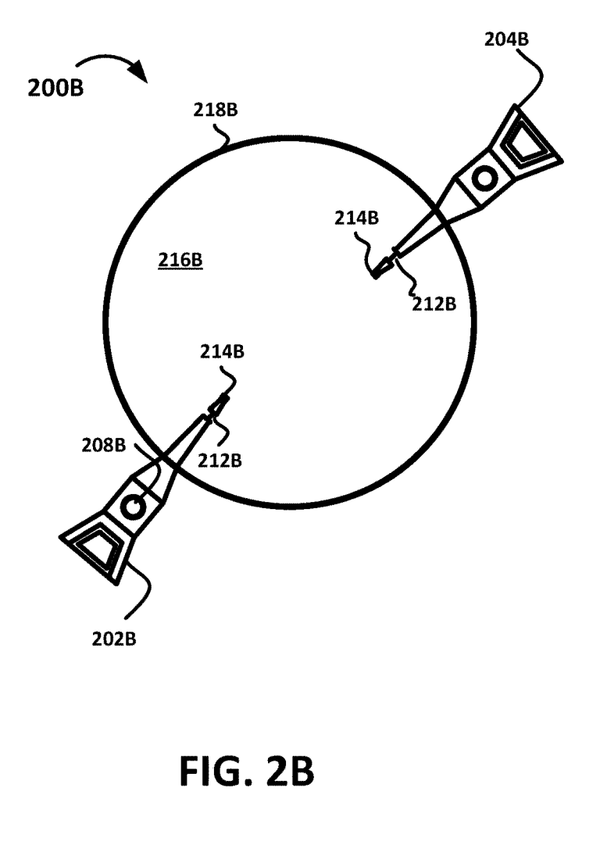
Figure 3A:
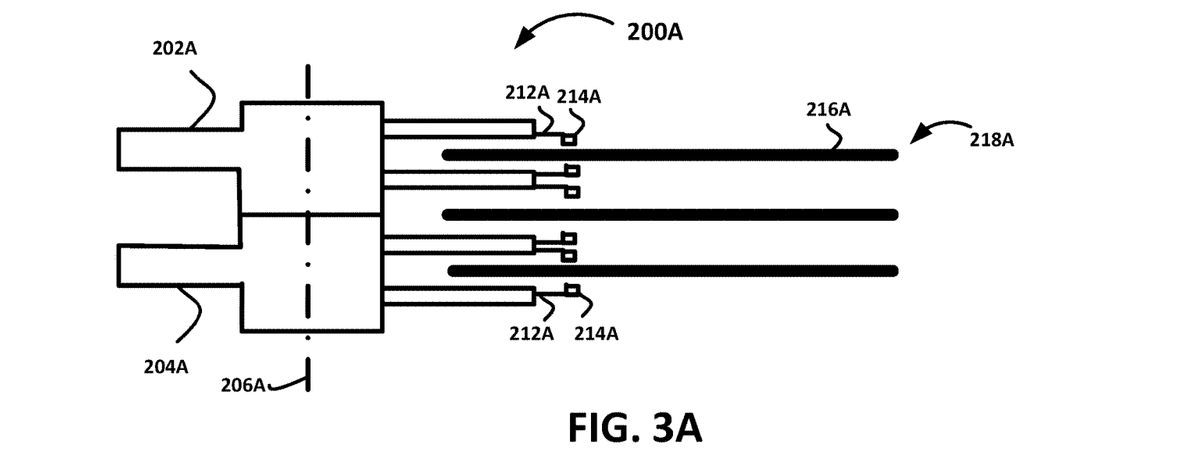
FIGS. 3A and 3B show side-view schematics of the multi-actuator configurations shown in FIGS. 2A and 2B.
Figure 3B:
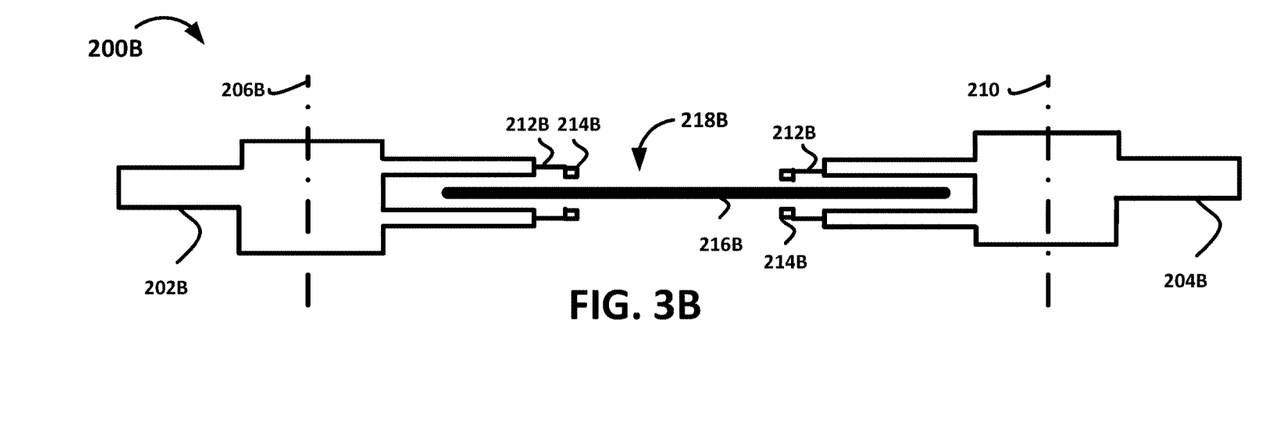

FIGS. 2A and 2B show top-view schematics of first and second configurations, 200A and 200B, respectively, of hard drives with multiple actuators. FIG. 3A shows a side-view schematic of the first configuration 200A, and FIG. 3B shows a side-view schematic of the second configuration 200B.

FIGS. 2A and 3A show the first configuration 200A having a first actuator 202A positioned above a second actuator 204A. The first actuator 202A and the second actuator 204A are rotatable around a common, first axis 206A. For example, the first actuator 202A can be stacked above the second actuator 204A on a common shaft 208A-B. FIG. 2B shows a second configuration 200B having a first actuator 202B rotatable around a first axis 206B and a second actuator 204B rotatable around a second, different axis 210 than the first axis 206B. The first and second actuators, 202A-B and 204A-B, each include at least one microactuator 212A-B like the microactuators 118 shown in FIG. 1. The first and second actuators, 202A-B and 204A-B, also each include at least one read/write head 214A, 214B.

In the multi-actuator configurations 200A-B, multiple read/write heads can be accessed independently and simultaneously. For example, while a read/write head 214A-B on the first actuator 202A-B is writing or reading data to and from a first surface 216A-B of a magnetic recording disk 218A-B, a read/write head 214A-B on the second actuator 204A-B can write or read data to and from another surface of different magnetic recording disk 218A-B. In the configuration 200B, multiple read/write heads 214A-B can simultaneously write or read data to and from same surface 216A-B of the magnetic recording disk 218A-B or a different surface of the same magnetic recording disk 218A-B. In some embodiments, one read/write head 214A-B can read user data from a magnetic recording disk 218A-B while another read/write head 214A-B simultaneously reads position data (e.g., servo data) from the same or different magnetic recording disk.

In some embodiments, one read/write head 214A on the first actuator 202A can read user data from the magnetic recording disk 218A-B while the second actuator 204A is rotated such that another read/write head 214A is positioned over a desired track for a next data operation, i.e., a track-seeking operation. If one actuator is performing a track-seeking operation while another actuator is performing a track-following operation, the track-seeking actuator can disturb the track-following actuator which can increase the probability of data reading or data writing errors. This actuator-to-actuator disturbance is caused by what is referred to as servo-mechanical coupling between the actuators. Certain embodiments of the present disclosure are accordingly directed to systems, methods, and devices that suppress and/or compensate for the effects of servo-mechanical coupling.

Figure 4:
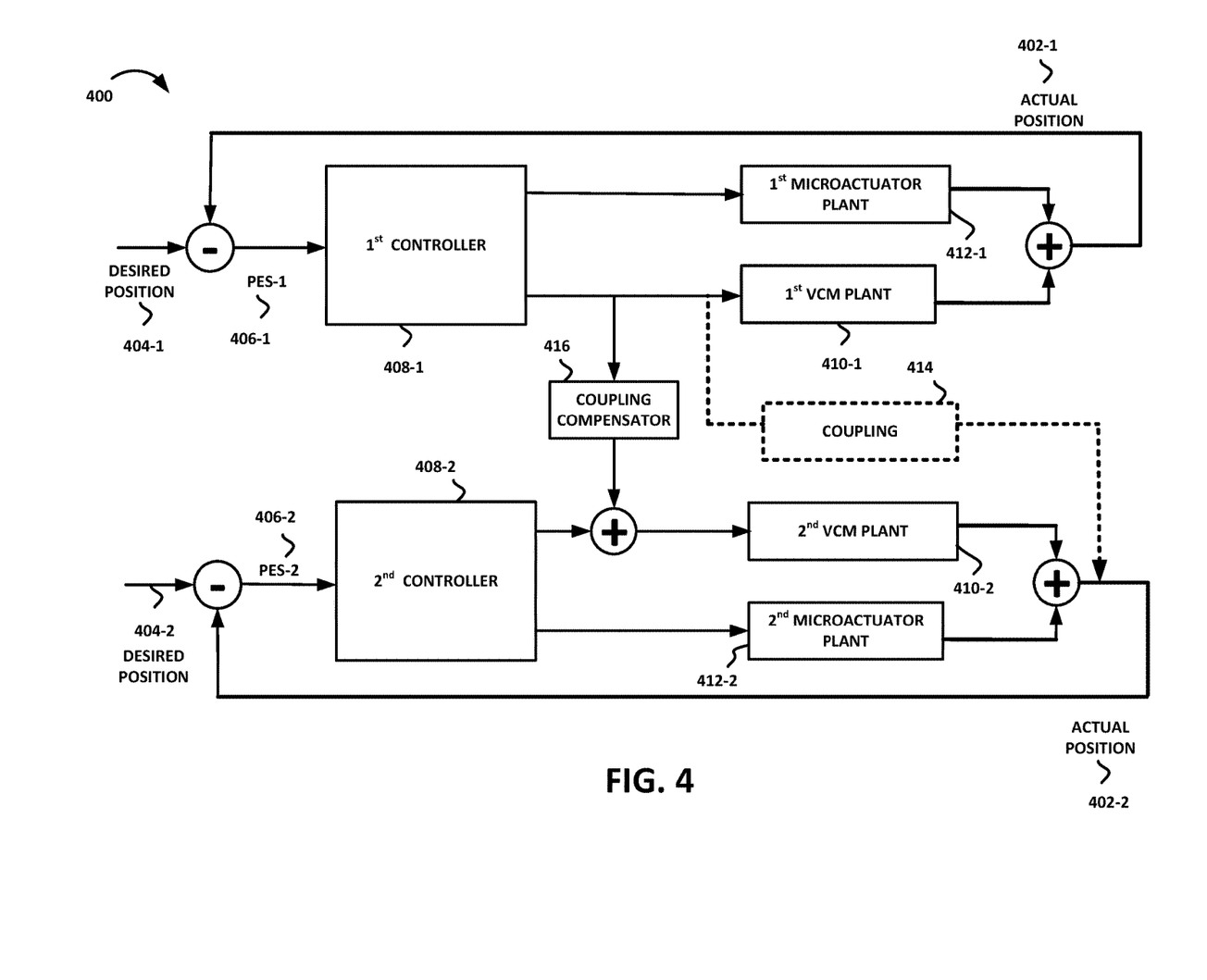
FIG. 4 shows a diagram of a servo control system, in accordance with certain embodiments of the present disclosure.

FIG. 4 provides a representation of a servo control system 400 used to position read/write heads in a multi-actuator hard drive. Using configuration 200A as an example, in operation, a read/write head 214A on the first actuator 202A reads servo data (e.g., positioning data) embedded on the first surface 216A of the magnetic recording disk 218A to determine an actual position 402-1 of the read/write head 214A relative to tracks on the magnetic recording disk 218A. The actual position 402-1 of the read/write head 214A is subtracted from a desired position 404-1 of the read/write head 214A to determine a first position error signal (PES-1) 406-1, which is the difference between where the read/write head 214A is and should be positioned. Similarly, a read/write head 214A on the second actuator 204A reads servo data embedded on a different magnetic recording disk 218A to determine an actual position 402-2 of the read/write head 214A relative to tracks on the different magnetic recording disk 218A. The actual position 402-2 of the read/write head 214A is subtracted from a desired position 404-2 of the read/write head 214A to determine a second position error signal (PES-2) 406-2, which is the difference between where the read/write head 214A is and should be positioned.

Generally, PES is used to adjust a position of a read/write head 214A with respect to tracks on a magnetic recording disk 218A such that the read/write head 214A is positioned over the desired track. For example, the PES-1 406-1 is inputted to first controller 408-1, which generates a first voice coil motor (VCM) control signal in response to the PES-1 406-1. The first VCM control signal controls the amount of current applied to a first VCM associated with the first actuator 202A to rotate the first actuator 202A. The first controller 408-1 can also generate a first microactuator control signal in response to the PES-1 406-1. The first microactuator control signal controls the amount of voltage applied to the microactuator (e.g., PZT elements) for pivoting the read/write head 214A. In some embodiments, the first controller 408-1 includes separate controllers for the VCM and microactuator. The position of the read/write head 214A resulting from the position of the VCM is represented in FIG. 4 by first VCM plant 410-1, and the position of the read/write head 214A resulting from the position of the microactuator is represented in FIG. 4 by microactuator plant 412-1.

Similarly, PES-2 406-2 is inputted to a second controller 408-2, which generates a second VCM control signal in response to the PES-2 406-2. The second VCM control signal controls the amount of current applied to a second VCM associated with the second actuator 204A to rotate the second actuator 204A. The second controller 408-2 can also generate a second microactuator control signal in response to the PES-2 406-2. The second microactuator control signal controls the amount of voltage applied to the microactuator for pivoting a read/write head 214A coupled to the second actuator 204A. In some embodiments, the second controller 408-2 includes separate controllers for the VCM and microactuator. The position of the read/write head 214A resulting from the position of the VCM is represented in FIG. 4 by second VCM plant 410-2, and the position of the read/write head 214A resulting from the position of the microactuator is represented in FIG. 4 by second microactuator plant 412-2.

Hard drives with multiple actuator assemblies, like those shown in FIGS. 2A-B and 3A-B, are subjected to effects caused by servo-mechanical coupling. Such servo-mechanical coupling is visually represented in dotted lines in FIG. 4 and element 414. The servo-mechanical coupling 414 shown in FIG. 4 represents disturbances induced to one actuator from another actuator. This servo-mechanical coupling 414 can increase PES for the disturbed actuator. In other words, PES induced by the servo-mechanical coupling 414 may affect the ability for a disturbed actuator to seek to, settle on, or follow its intended target track on the magnetic recording disk 218A.

One approach to accounting for servo-mechanical coupling 414 is to utilize a coupling compensator 416. Equations 1-3 provided below derive a transfer function that represents an ideal coupling compensator. The terms in Equations 1-3 describe various functions and dynamics of the servo control system 400:

$PES_{dist}(s)$=position error signal caused by servo-mechanical coupling;
$u_{VCM}A(s)$=first VCM control signal;
$C(s)$=coupling transfer function;
$S(s)$=closed-loop sensitivity;
$PES_{comp}(s)$=compensation for $PES_{dist}(s)$;
$V(s)$=VCM structural response;
$u_{VCM}B(s)$=coupling compensation component of the second VCM; and
$C_{ff}^{id}(s)$=transfer function for ideal coupling compensator.

Equation 1 represents a transfer function from VCM current of a seeking actuator to coupling induced component of the PES of a tracking actuator.

$$\frac{PES_{dist}(s)}{u_{vcmA}(s)} = C(s) \cdot S(s)$$

Equation 2 represents a tracking function from the additional current introduced at the VCM of the tracking actuator to its resulting contribution of PES.

$$\frac{PES_{comp}(s)}{u_{vcmB}(s)} = V(s) \cdot S(s)$$

Equation 3 represents a transfer function for an ideal coupling compensator 416, derived by division of Equation 1 by Equation 2 and making $PES_{dist}(s)$ equal to $PES_{comp}(s)$.

$$C_{ff}^{id}(s) = \frac{u_{vcmB}(s)}{u_{vcmA}(s)} = \frac{C(s)}{V(s)}$$

Using Equation 3 as a guide, one concern with implementing a coupling compensator is that, when the relative degree of V(s) is larger than the relative degree of C(s), $C_{ff}^{id}(s)$—the transfer function for an ideal coupling compensator—may become noncausal. Noncausality can also occur if delay present in V(s) is larger than delay in C(s). Noncausality of $C_{ff}^{id}(s)$ indicates that a coupling compensator would require future values of total VCM current as input. In order to be able to compute future values of the VCM current generated by the first controller 408-1, future values of PES-1 would need to be known, which is not possible.

Certain embodiments of the present disclosure are accordingly directed to systems, methods, and devices that compensate for servo-mechanical coupling and overcome noncausality.

Figure 5:
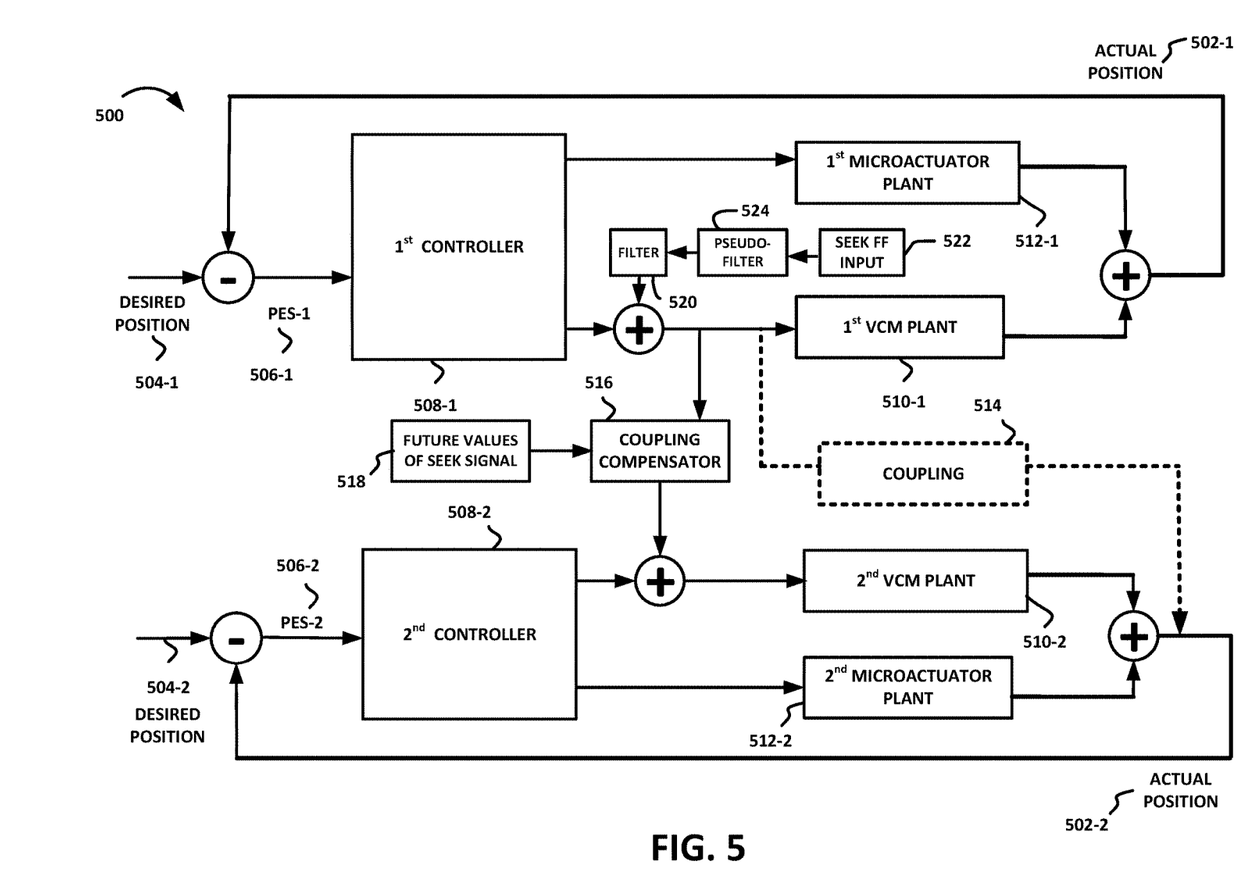
FIG. 5 shows a diagram of a servo control system, in accordance with certain embodiments of the present disclosure.

FIG. 5 provides a representation of a servo control system 500 used to position read/write heads in a multi-actuator hard drive. Using configuration 200A as an example, in operation, a read/write head 214A on the first actuator 202A reads servo data (e.g., positioning data) embedded on a magnetic recording disk 218A to determine an actual position 502-1 of the read/write head 214A relative to tracks on the magnetic recording disk 218A. The actual position 502-1 of the read/write head 214A is subtracted from a desired position 504-1 of the read/write head 214A to determine a first position error signal (PES-1) 506-1, which is the difference between where the read/write head 214A is and should be positioned. Similarly, a read/write head 214A on the second actuator 204A reads servo data embedded on the same or different magnetic recording disk 218A to determine an actual position 502-2 of the read/write head 214A relative to tracks on a different magnetic recording disk. The actual position 502-2 of the read/write head 214A is subtracted from a desired position 504-2 of the read/write head to determine a second position error signal (PES-2) 506-2, which is the difference between where the read/write head 214A is and should be positioned.

PES-1 506-1 is inputted to first controller 508-1, which generates a VCM control signal in response to the PES-1 506-1. The first VCM control signal controls the amount of current applied to a first VCM associated with the first actuator 202A to rotate the first actuator 202A. The first controller 508-1 can also generate a first microactuator control signal in response to the PES-1 506-1. The first microactuator control signal controls the amount of voltage applied to the microactuator (e.g., PZT elements) for pivoting the read/write head. In some embodiments, the first controller 508-1 includes separate controllers for the VCM and microactuator. The position of the read/write head 214A resulting from the position of the VCM is represented in FIG. 4 by first VCM plant 510-1, and the position of the read/write head 214A resulting from the position of the microactuator is represented in FIG. 5 by microactuator plant 512-1.

Similarly, PES-2 506-2 is inputted to second controller 508-2, which generates a second VCM control signal in response to the PES-2 506-2. The second VCM control signal controls the amount of current applied to a second VCM associated with the second actuator 204A to rotate the second actuator 204A. The second controller 508-2 can also generate a second microactuator control signal in response to the PES-2 506-2. The second microactuator control signal controls the amount of voltage applied to the microactuator for pivoting the read/write head. In some embodiments, the second controller 508-2 includes separate controllers for the VCM and microactuator. The position of the read/write head 214A resulting from the position of the VCM is represented in FIG. 5 by second VCM plant 510-2, and the position of the read/write head 214A resulting from the position of the microactuator is represented in FIG. 5 by second microactuator plant 512-2.

To compensate for servo-mechanical coupling, FIG. 5 shows a coupling compensator 516, which is configured to generate a feedforward correction signal that modifies (e.g., is injected into) the second VCM control signal to create a modified second VCM control signal. For simplicity, the following description features various approaches for compensating for coupling caused only by one actuator and its effect on another actuator. It is appreciated that one or more coupling compensators can be implemented to compensate for disturbances caused by second VCM to the first VCM, etc.

The inventors of the present disclosure have found that noncausality can be overcome by utilizing a coupling compensator 516 that uses deterministic seek information and signals (e.g., feedforward seek current) along with nondeterministic feedback signals (e.g., VCM current) to generate a feedforward correction signal. Such a coupling compensator 516 allows for direct cancellation of delays in the servo control system and direct compensation of non-minimum phase zeros. Deterministic seek information and/or signals (represented by element 518 in FIG. 5) can include precomputed future values of the seek signal. Here, future values can be precomputed (and not based on future PES values) because feedforward seek signals are computed at least partially based on a read/write head's destination position, which is known ahead of time, as well as an initial head position. Deterministic seek signals have little dependence on PES during a track-seeking operation because—during acceleration and deceleration periods of a track-seeking operation—the VCM control signal is primarily dependent on the feedforward seek signal rather than VCM control signal, which is a feedback-based control signal based on PES. As such, the present disclosure takes advantage of an understanding that contribution of the VCM current generated by first controller 408-1 during a track-seeking operation is relatively small compared to feedforward information and signals.

The deterministic seek information and/or signals 518 can be inputted to the coupling compensator 516. The coupling compensator 516 is configured to generate a feedforward correction signal in response to the deterministic seek signals 518. In some embodiments, the feedforward correction signal can also be generated in response to nondeterministic signals such as the first VCM control signal generated by the first controller 508-1. The feedforward correction signal modified (e.g., is injected into) the second VCM control signal to create a second modified VCM control signal, which controls VCM current to the second VCM 510-2.

As mentioned above, the effects of servo-mechanical coupling are prevalent when a read/write head associated with one actuator is reading data from or writing data to a track on a magnetic recording disk (and therefore performing a track-following operation) while another actuator is rotating to position its read/write head from one track to another (and therefore performing a track-seeking operation). The track-seeking actuator induces disturbance on the track-following actuator because of servo-mechanical coupling which can reduce performance and/or cause reading and writing errors.

Although the coupling compensator 516 is shown as having a single output, the coupling compensator 516 can be a multi-output compensator such that the coupling compensator 516 is configured to generate multiple feedforward correction signals. For example, one feedforward correction signal could be used to compensate for disturbances better suited to be addressed by the VCM (e.g., lower frequency disturbances) while another feedforward correction signal is used to compensate for disturbances better suited to be addressed by the microactuator (e.g., higher frequency disturbances) due to the microatuator's wider bandwidth.

The coupling compensator 516 can be implemented as various types of feedforward controllers, including but not limited to gain-scheduled controllers, joint process estimators, adaptive lattice filters, and adaptive compensators, which can be based on recurrent learning approaches. In addition, the coupling compensator 516 can utilize various computation schemes in generating the feedforward correction signal. For example, in some embodiments, the coupling compensator 516 can utilize dynamic feedforward computation that attempts to estimate the servo-mechanical coupling 514. In some embodiments, the coupling compensator 516 utilizes a gain-scheduled feedforward computation, which considers effects of temperature, absolute and relative position of the heads as well as involved head numbers to estimate the servo-mechanical coupling 514. For example, gain scheduling can be performed based on polynomial computation, interpolation of the values from lookup tables or by other known methods. In some embodiments, the coupling compensator 516 utilizes an adaptive gain feedforward computation where the first VCM control signal is scaled by an adaptive gain to generate the feedforward correction signal. For example, the scaling factor can be adjusted in real time based on gradient descent law. In some embodiments, the coupling compensator 516 utilizes computation techniques that include both adaptive gain and consideration of other system parameters such that the feedforward correction signal is adjusted in real time to accommodate system uncertainty. For example, the coupling compensator 516 can utilize both a joint process estimator and model reference adaptive control approach. It is appreciated that other types of feedforward controllers and computation approaches can be utilized by the coupling compensator 516.

In addition to—or independently from—compensating for servo-mechanical coupling via the coupling compensator 516, the inventors of the present disclosure have found that the certain effects of servo-mechanical coupling can be suppressed by filtering target frequencies in feedforward seek current, which can be generated by a feedforward seek controller. A filter 520 is configured to target certain frequency ranges that interfere or disturb a track-following actuator such that the targeted frequencies are suppressed. The filter 520 is configured to filter the feedforward seek signal to generate a filtered feedforward seek signal, which can modify the first VCM control signal to generate a modified first VCM control signal.

In some embodiments, the targeted frequencies include frequencies of the kHz range. In some embodiments, the filter 520 is configured to target higher-frequency coupling modes, for example, modes that are above a first major (or dominant) coupling mode. The filter 520, which can be a notch filter, can utilize a gain-filtering approach to suppress the target frequencies. Such an approach gain-filters seek current and also correct the seek current's phase. The filter 520 can also implement gain-scheduling or parameter-adaptation approaches such that the filter's targeted frequencies (e.g., notch frequency) are changed in response to a hard drive's parameters. For example, the filter's notch frequency can be modified as temperature of a hard drive's internal environment changes. Hard drives can be provisioned with temperature sensors (e.g., thermistors), and, in some embodiments, the filter 520 can be programmed to change notch frequencies according to predetermined temperature offsets. In some embodiments, the filter 520 filtering is activated upon feedforward seek current rising above zero.

The servo control system 500 can also include a pseudo-filter 524. The pseudo-filter 524 corrects for phase error (or phase lag) introduced by the filter 520. This can be accomplished, for example, by configuring the pseudo-filter 524 to target higher frequencies.

In addition to suppressing effects of servo-mechanical coupling, the filter 520 can suppress seek trajectory repeatable runout (STRRO), which refers to a repeatable PES present during track-seeking operations. The filter 520 can suppress STRRO on both the track-following head and the track-seeking head.

Although FIG. 5 shows only one filter 520 and pseudo-filter 524, it is appreciated that the servo control system 500 can includes multiple filters and pseudo-filters. In some embodiments, each actuator has its own at least one dedicated filter and at least one pseudo-filter. In some embodiments, the filter 520 and pseudo-filter 524 are utilized for both actuators.

As mentioned above, the filter 520 and pseudo-filter 524 approach can complement the approach provided by the coupling compensator 516. The filter approach can be characterized as a "passive" approach in that the filter 520 suppresses effects of servo-mechanical coupling before the effects are realized while the coupling compensator 516 "actively" compensates for effects of servo-mechanical coupling after the effects are realized. These approaches can be implemented independently or in tandem. When implemented in tandem, the approaches can be used to target different coupling modes. For example, the filter approach can target higher-frequency modes while the coupling compensator approach targets lower-frequency modes. More specifically, the coupling compensator 516 can be configured to target the first one or few major coupling modes, which are typically below 3 kHz. And the filter 520 can be configured to target coupling modes above the first one or few major coupling modes.

Figure 6:
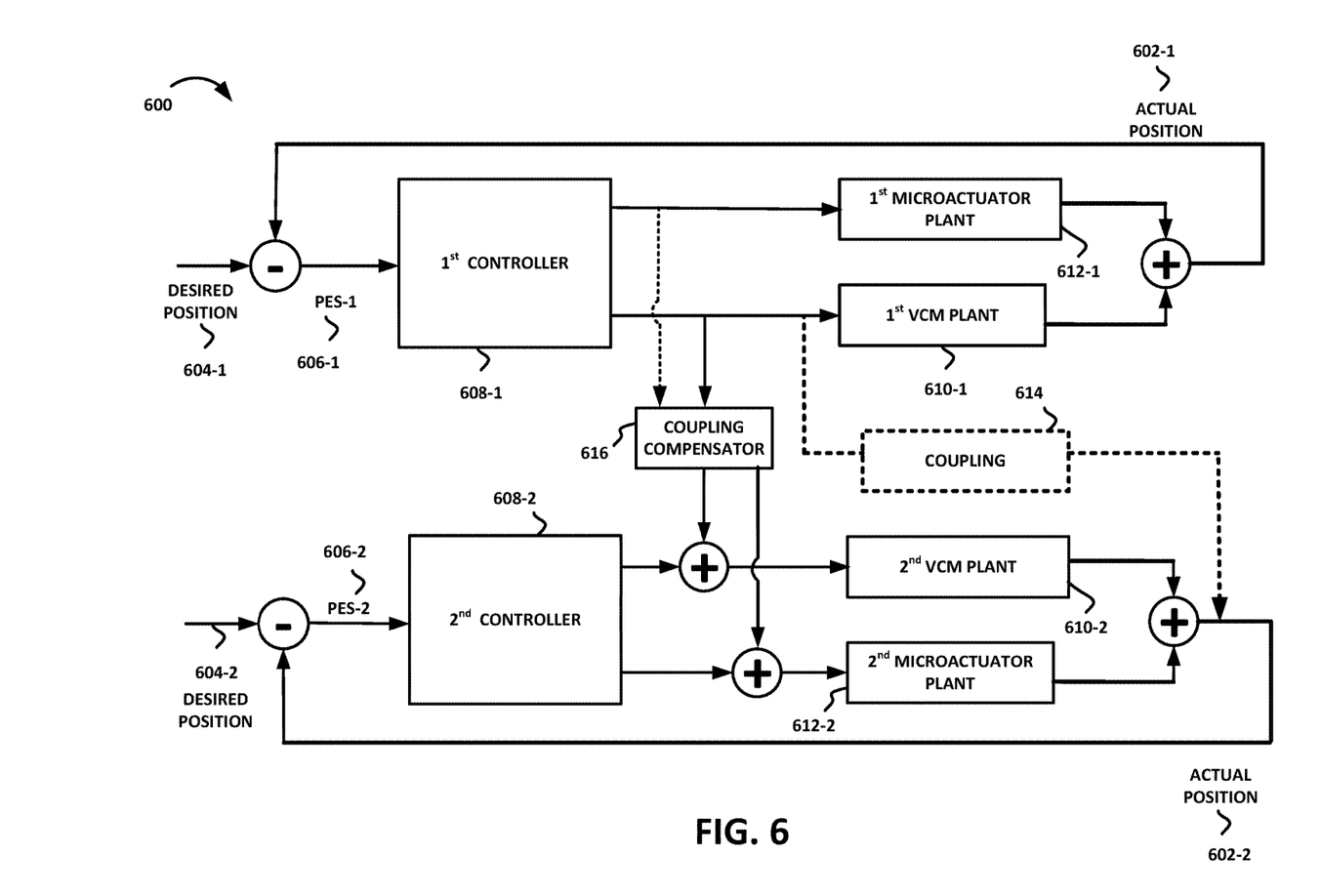
FIG. 6 shows a diagram of a servo control system, in accordance with certain embodiments of the present disclosure.

FIG. 6 provides a representation of a servo control system 600 used to position read/write heads in a multi-actuator hard drive. Using configuration 200A as an example, in operation, a read/write head 214A on the first actuator 202A reads servo data (e.g., positioning data) embedded on a magnetic recording disk 218A to determine an actual position 602-1 of the read/write head 214A relative to tracks on the magnetic recording disk 218A. The actual position 602-1 of the read/write head 214A is subtracted from a desired position 604-1 of the read/write head 214A to determine a first position error signal (PES-1) 606-1, which is the difference between where the read/write head 214 is and should be positioned. Similarly, a read/write head 214A on the second actuator 204A reads servo data embedded on the same or different magnetic recording disk 218A to determine an actual position 602-2 of the read/write head 214A relative to tracks on a different magnetic recording disk. The actual position 602-2 of the read/write head 214A is subtracted from a desired position 604-2 of the read/write head to determine a second position error signal (PES-2) 606-2, which is the difference between where the read/write head 214A is and should be positioned.

PES-1 606-1 is inputted to first controller 608-1, which generates a first voice coil motor (VCM) control signal in response to the PES-1 606-1. The first VCM control signal controls the amount of current applied to a first VCM associated with the first actuator 202A to rotate the first actuator 202A. The first controller 608-1 can also generate a first microactuator control signal in response to the PES-1 606-1. The first microactuator control signal controls the amount of voltage applied to the microactuator (e.g., PZT elements) for pivoting the read/write head. In some embodiments, the first controller 608-1 includes separate controllers for the VCM and microactuator. The position of the read/write head 214A resulting from the position of the VCM is represented in FIG. 6 by first VCM plant 610-1, and the position of the read/write head 214A resulting from the position of the microactuator is represented in FIG. 6 by microactuator plant 612-1.

Similarly, PES-2 606-2 is inputted to second controller 608-2, which generates a second VCM control signal in response to the PES-2 606-2. The second VCM control signal controls the amount of current applied to a second VCM associated with the second actuator 204A to rotate the second actuator 204A. The second controller 608-2 can also generate a second microactuator control signal in response to the PES-2 606-2. The second microactuator control signal controls the amount of voltage applied to the microactuator for pivoting the read/write head. In some embodiments, the second controller 608-2 includes separate controllers for the VCM and microactuator. The position of the read/write head 214A resulting from the position of the VCM is represented in FIG. 6 by second VCM plant 610-2, and the position of the read/write head 214A resulting from the position of the microactuator is represented in FIG. 6 by second microactuator plant 612-2.

The servo control system 600 includes a coupling compensator 616, which is configured to generate a feedforward correction signal that modifies the second VCM control signal to compensate for servo-mechanical coupling effects. For example, as mentioned above, the feedforward correction signal can compensate for effects of servo-mechanical coupling induced to a track-following actuator from a track-seeking actuator. Because servo-mechanical coupling between two actuators will be similar in some embodiments, the feedforward correction signal may, itself, induce coupling as a result of feedforward correction signal propagating back to the track-seeking actuator. This results in a positive feedback loop, which may affect performance and/or stability of a closed-loop servo control system. For example, the servo control system's stability can be compromised if the coupling response gain approaches 0 dB at some frequency.

The servo control system 600 mitigates such effects by reducing or eliminating positive feedback loops. FIG. 6 shows the coupling compensator 616 having at least one input that is tapped from the first VCM control signal. FIG. 6 also shows an optional second input (in dotted lines) that is tapped from the first microactuator control signal. In response to the first VCM and/or first microactuator control signals, the coupling compensator 616 is configured to generate a feedforward correction signal and inject a portion (or all) of the feedforward correction signal to the second microactuator control signal. Because microactuators have less inertia (and therefore produce little to no servo-mechanical coupling), microactuators are less likely to cause or contribute to a parasitic positive feedback loop. The coupling compensator 616 can include one or more bandpass filters to create a microactuator feedforward correction signal and, in some embodiments, a VCM feedforward correction signal that are injected into the second microactuator control signal and second VCM control signal, respectively. In some embodiments, the coupling compensator 616 is a single-input-multiple-output (SIMO) device or a multiple-input-multiple-output (MIMO) device in which cases the SIMO or MIMO devices can generate a separate microactuator feedforward correction signal and VCM feedforward correction signal.

Figure 7:
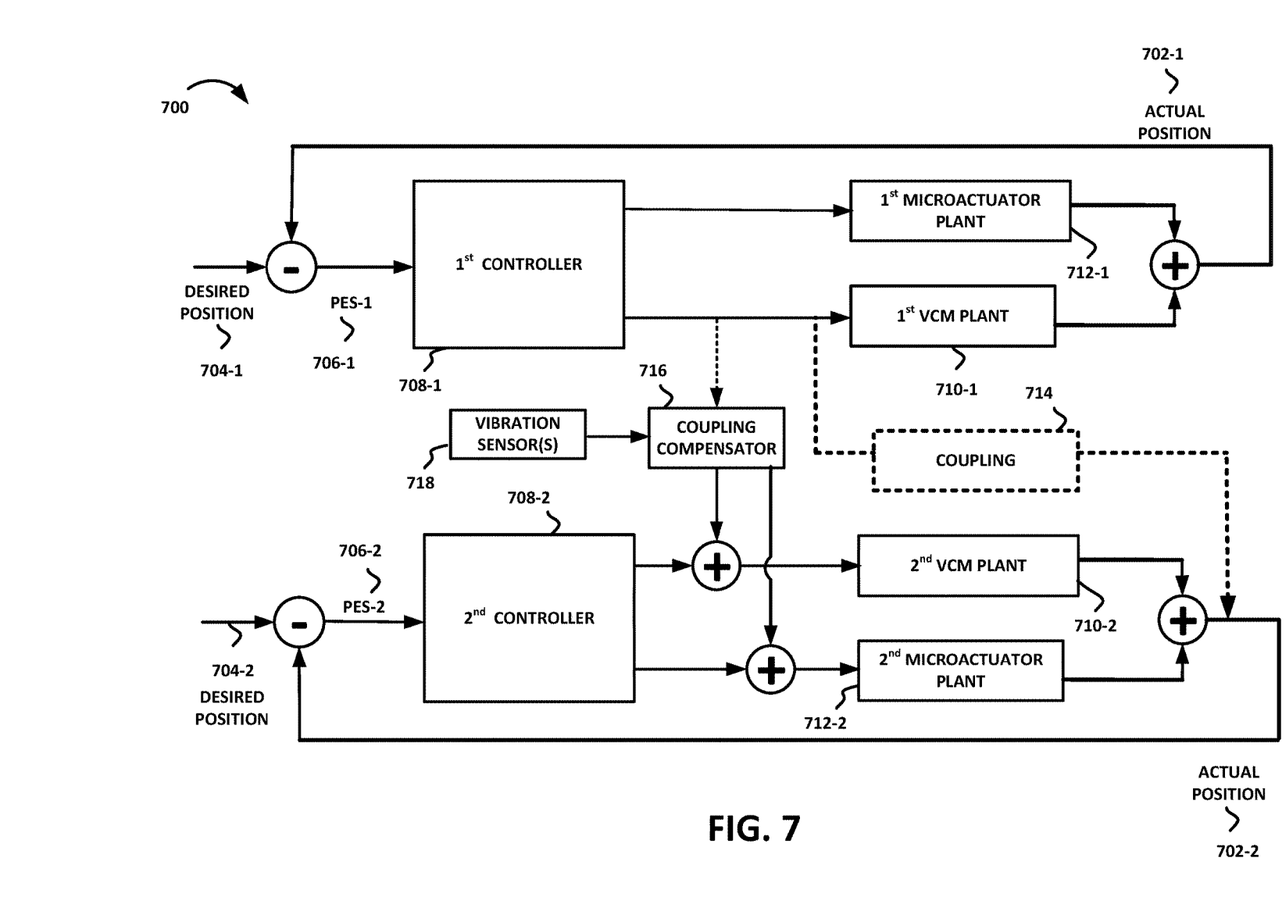
FIG. 7 shows a diagram of a servo control system, in accordance with certain embodiments of the present disclosure.

FIG. 7 provides a representation of a servo control system 700 used to position read/write heads in a multi-actuator hard drive. Using configuration 200B as an example, in operation, a read/write head 214B on the first actuator 202B reads servo data (e.g., positioning data) embedded on a magnetic recording disk 218B to determine an actual position 702-1 of the read/write head 214B relative to tracks on the magnetic recording disk 218B. The actual position 702-1 of the read/write head 214B is subtracted from a desired position 704-1 of the read/write head 214B to determine a first position error signal (PES-1) 706-1, which is the difference between where the read/write head 214 is and should be positioned. Similarly, a read/write head 214B on the second actuator 204B reads servo data embedded on the same or different magnetic recording disk 218B to determine an actual position 702-2 of the read/write head 214B relative to tracks on a different magnetic recording disk. The actual position 702-2 of the read/write head 214B is subtracted from a desired position 704-2 of the read/write head to determine a second position error signal (PES-2) 706-2, which is the difference between where the read/write head 214B is and should be positioned.

PES-1 706-1 is inputted to first controller 708-1, which generates a first voice coil motor (VCM) control signal in response to the PES-1 706-1. The first VCM control signal controls the amount of current applied to a first VCM associated with the first actuator 202B to rotate the first actuator 202B. The first controller 708-1 can also generate a first microactuator control signal in response to the PES-1 706-1. The first microactuator control signal controls the amount of voltage applied to the microactuator (e.g., PZT elements) for pivoting the read/write head. In some embodiments, the first controller 708-1 includes separate controllers for the VCM and microactuator. The position of the read/write head 214B resulting from the position of the VCM is represented in FIG. 7 by second VCM plant 710-1, and the position of the read/write head 214B resulting from the position of the microactuator is represented in FIG. 7 by second microactuator plant 712-1.

Similarly, PES-2 706-2 is inputted to second controller 708-2, which generates a second VCM control signal in response to the PES-2 706-2. The second VCM control signal controls the amount of current applied to a second VCM associated with the second actuator 204B to rotate the second actuator 204B. The second controller 708-2 can also generate a second microactuator control signal in response to the PES-2 706-2. The second microactuator control signal controls the amount of voltage applied to the microactuator for pivoting the read/write head. In some embodiments, the second controller 708-2 includes separate controllers for the VCM and microactuator. The position of the read/write head 214B resulting from the position of the VCM is represented in FIG. 7 by second VCM plant 710-2, and the position of the read/write head 214B resulting from the position of the microactuator is represented in FIG. 7 by second microactuator plant 712-2.

In the configuration 200B shown in FIG. 2B, the first and second actuators 202B and 204B are positioned on separate shafts rotatable around separate axis, 206B and 210. When the first actuator 202B performs a track-seeking operation, the first actuator 202B induces disturbance on the second actuator 204B via servo-mechanical coupling. The servo-mechanical coupling propagates, at least partially, from the first actuator 202B to the second actuator 204B via a path involving a basedeck of the hard drive (e.g., base deck 102 shown in FIG. 1). When the hard drive is provisioned with at least one vibration sensors 718 (e.g., accelerometers), the servo-mechanical coupling through the basedeck can be detected by the at least one vibration sensor 718. In some embodiments, servo-mechanical coupling is detected by multiple accelerometers positioned on a printed circuit board assembly (e.g., printed circuit board assembly 126 in FIG. 1) coupled to the basedeck. In some embodiments, servo-mechanical coupling is detected by a vibration sensor directly coupled to the basedeck. The one or more vibration sensors 718 generate vibration signals can be inputted to the coupling compensator 716. In response to the vibration signals, the coupling compensator 716 can generate a feedforward correction signal that modifies (e.g., is injected into) the second VCM control signal to create a second modified VCM control signal to control positioning of the second VCM plant 710-2.

The various embodiments and components described above may be implemented using firmware, integrated circuits, and/or software modules that interact with each other or are combined together. For example, the control diagrams illustrated herein may be used to create computer-readable instructions/code for execution by a processor. Such instructions may be stored on a non-transitory computer-readable disk and transferred to a processor for execution. In another example, the embodiments and components described above, such as components of the servo control system 400, are implemented in one or more application-specific integrated circuits (ASIC) and/or other circuitry. The structures and procedures shown above are only a representative example of embodiments that can be used to provide the functions described hereinabove.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. An apparatus comprising:
 a first controller configured to generate a first voice coil motor (VCM) control signal in response to a first position error signal;
 a second controller configured to generate a second VCM control signal in response to a second position error signal; and a coupling compensator configured to generate a first feedforward correction signal in response to the first VCM control signal and in response to precomputed future values of a feedforward seek signal, wherein the first feedforward correction signal modifies the second VCM control signal to generate a modified second VCM control signal.

2. The apparatus of claim 1, wherein the feedforward seek signal is a feedforward seek signal for the first VCM.

3. The apparatus of claim 1, further comprising:
a notch filter configured to filter targeted frequencies of the feedforward seek signal.

4. The apparatus of claim 3, wherein the targeted frequencies are in a kHz range.

5. The apparatus of claim 3, further comprising:
a pseudo-filter configured to correct for phase error introduced by the notch filter.

6. The apparatus of claim 1, wherein the coupling compensator is further configured to output a microactuator feedforward correction signal that modifies a second microactuator control signal.

7. The apparatus of claim 6, wherein the coupling compensator includes a bandpass filter configured to generate the microactuator feedforward correction signal.

8. The apparatus of claim 1, wherein the first VCM control signal is used for a track-seeking operation, and wherein the second VCM control signal is used to a track-following operation.

9. The apparatus of claim 1, further comprising:
a first actuator assembly including a first VCM, a first microactuator, and a first read/write head; and
a second actuator assembly including a second VCM, a second microactuator, and a second read/write head.

10. The apparatus of claim 9, wherein the modified second VCM control signal is used to position the second read/write head.

11. The apparatus of claim 1, wherein the first and second controllers each include a VCM controller and a microactuator controller.

12. The apparatus of claim 1, wherein the first feedforward correction signal modifies the first VCM control signal to generate a modified first VCM control signal.

13. An apparatus comprising:
a first controller configured to generate a first voice coil motor (VCM) control signal in response to a first position error signal;
a second controller configured to generate a second VCM control signal in response to a second position error signal;
a feedforward seek controller configured to generate a feedforward seek signal; and
a notch filter configured to suppress targeted frequencies of the feedforward seek signal to generate a filtered feedforward seek signal, wherein the filtered feedforward seek signal modifies the first VCM control signal to generate a modified first VCM control signal.

14. The apparatus of claim 13, wherein the targeted frequencies are in a kHz range.

15. The apparatus of claim 13, wherein a targeted frequency is determined in response to a measured temperature.

16. The apparatus of claim 13, further comprising:
a pseudo-filter configured to correct for phase error introduced by the notch filter.

17. An apparatus comprising:
a first controller configured to generate a first voice coil motor (VCM) control signal in response to a first position error signal;
a second controller configured to generate a second VCM control signal in response to a second position error signal; and
a coupling compensator configured to generate a first feedforward correction signal in response to the first VCM control signal and in response to a vibration sensor signal, wherein the first feedforward correction signal modifies the second VCM control signal to generate a modified second VCM control signal.

18. The apparatus of claim 17, further comprising:
a feedforward seek controller configured to generate a feedforward seek signal; and
a notch filter configured to suppress targeted frequencies of the feedforward seek signal to generate a filtered feedforward seek signal, wherein the filtered feedforward seek signal modifies the first VCM control signal to generate a modified first VCM control signal.

19. The apparatus of claim 17, wherein the second controller is configured to generate a second microactuator control signal.

20. The apparatus of claim 19, wherein the coupling compensator is further configured to output a microactuator feedforward correction signal that modifies the second microactuator control signal.

* * * * *